United States Patent
Baik

(10) Patent No.: US 9,696,521 B2
(45) Date of Patent: Jul. 4, 2017

(54) LENS MODULE

(71) Applicant: Samsung Electro-Mechanics Co., Ltd., Suwon-si (KR)

(72) Inventor: Jae Hyun Baik, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/947,279

(22) Filed: Nov. 20, 2015

(65) Prior Publication Data

US 2016/0178870 A1    Jun. 23, 2016

(30) Foreign Application Priority Data

Dec. 22, 2014  (KR) ........................ 10-2014-0185960

(51) Int. Cl.
*G02B 3/02*    (2006.01)
*G02B 13/00*   (2006.01)

(52) U.S. Cl.
CPC ................................ *G02B 13/0045* (2013.01)

(58) Field of Classification Search
CPC ..................................................... G02B 13/004
USPC ......................................................... 359/714
See application file for complete search history.

(56) References Cited

U.S. PATENT DOCUMENTS

| | | |
|---|---|---|
| 2012/0069455 A1 | 3/2012 | Lin et al. |
| 2013/0088788 A1 | 4/2013 | You |
| 2013/0342919 A1 | 12/2013 | Tang et al. |
| 2014/0285710 A1 | 9/2014 | Chen et al. |
| 2014/0285907 A1 | 9/2014 | Tang et al. |
| 2015/0323765 A1* | 11/2015 | Hashimoto ........ G02B 13/0045 359/714 |
| 2016/0004043 A1* | 1/2016 | Hashimoto .............. G02B 9/60 359/714 |

FOREIGN PATENT DOCUMENTS

| | | |
|---|---|---|
| JP | 2014-182380 A | 9/2014 |
| KR | 10-2013-0038631 A | 4/2013 |

OTHER PUBLICATIONS

Korean Office Action issued Jul. 1, 2016, in counterpart Korean Application No. 10-2014-0185960 (9 pages in English, 7 pages in Korean).

* cited by examiner

*Primary Examiner* — James Jones
(74) *Attorney, Agent, or Firm* — NSIP Law

(57) ABSTRACT

A lens module includes: a first lens including a convex object-side surface and a convex image-side surface; a second lens including a concave image-side surface; a third lens including a concave object-side surface; a fourth lens having negative refractive power, and including a concave object-side surface; and a fifth lens having negative refractive power and including an image-side surface having one or more inflection points and a convex object-side surface. The first lens, the second lens, the third lens, the fourth lens and the fifth lens are sequentially disposed in a direction from an object side of the lens module. The expression f/ImgH<1.3 is satisfied, with f being an overall focal length of an optical system including the first lens, the second lens, the third lens, the fourth lens and the fifth lens, and with ImgH being half of a diagonal length of an image sensor.

21 Claims, 15 Drawing Sheets

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| ST | Infinity | -0.155 | | | STOP |
| 1 | 1.647 | 0.630 | 1.5470 | 56.10 | FIRST LENS |
| 2 | -8.392 | 0.096 | | | |
| 3 | 1E+18 | 0.210 | 1.6500 | 21.50 | SECOND LENS |
| 4 | 3.196 | 0.288 | | | |
| 5 | -5.481 | 0.418 | 1.5470 | 56.10 | THIRD LENS |
| 6 | -2.062 | 0.218 | | | |
| 7 | -1.219 | 0.315 | 1.6500 | 21.50 | FOURTH LENS |
| 8 | -1.549 | 0.448 | | | |
| 9 | 1.969 | 0.803 | 1.5350 | 55.70 | FIFTH LENS |
| 10 | 1.227 | 0.345 | | | |
| 11 | Infinity | 0.110 | 1.5160 | 55.15 | FILTER |
| 12 | Infinity | 0.560 | | | |
| IMAGE PLANE | Infinity | -0.010 | | | |

FIG. 4

| FIRST EXAMPLE EMBODIMENT | 1 | 2 | 4 | 5 | 6 | 7 | 8 | 9 | 10 |
|---|---|---|---|---|---|---|---|---|---|
| RADIUS OF CURVATURE | 1.6467 | -8.3918 | 3.1956 | -5.4809 | -2.0623 | -1.2188 | -1.5495 | 1.9687 | 1.2268 |
| CONIC (K) | 0.1027 | -99.0000 | -37.1685 | 34.2544 | -22.4010 | -8.2996 | 0.3742 | -13.8119 | -5.2512 |
| 4TH ORDER (A) | -0.0208 | -0.0148 | 0.0908 | -0.0904 | -0.1532 | -0.0138 | 0.1704 | -0.1359 | -0.0765 |
| 6TH ORDER (B) | 0.0530 | 0.0423 | -0.2314 | -0.2272 | 0.0208 | -0.0089 | -0.0942 | 0.0256 | 0.0290 |
| 8TH ORDER (C) | -0.3402 | -0.6770 | 0.7057 | 0.4862 | -0.3555 | -0.5072 | -0.0865 | 0.0048 | -0.0099 |
| 10TH ORDER (D) | 0.6891 | 1.8900 | -1.4238 | -0.1504 | 1.2431 | 1.2377 | 0.3661 | -0.0017 | 0.0023 |
| 12TH ORDER (E) | -0.7458 | -2.6032 | 2.0096 | -0.1943 | -1.6714 | -1.3047 | -0.3978 | 0.0001 | -0.0003 |
| 14TH ORDER (F) | 0.2820 | 1.3768 | -1.5243 | 0.7177 | 1.1242 | 0.5641 | 0.1923 | 0.0000 | 0.0000 |
| 16TH ORDER (G) | 0.0000 | 0.0000 | 0.4535 | -0.4577 | -0.2835 | -0.0661 | -0.0327 | 0.0000 | 0.0000 |

FIG. 5

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| ST | Infinity | −0.155 | | | STOP |
| 1 | 1.585 | 0.726 | 1.5470 | 56.10 | FIRST LENS |
| 2 | −8.168 | 0.060 | | | |
| 3 | 1E+18 | 0.230 | 1.6500 | 21.50 | SECOND LENS |
| 4 | 3.235 | 0.301 | | | |
| 5 | −4.942 | 0.411 | 1.5470 | 56.10 | THIRD LENS |
| 6 | −1.941 | 0.212 | | | |
| 7 | −1.149 | 0.354 | 1.6500 | 21.50 | FOURTH LENS |
| 8 | −1.579 | 0.299 | | | |
| 9 | 2.020 | 0.862 | 1.5350 | 55.70 | FIFTH LENS |
| 10 | 1.317 | 0.316 | | | |
| 11 | Infinity | 0.110 | 1.5160 | 55.15 | FILTER |
| 12 | Infinity | 0.548 | | | |
| IMAGE PLANE | Infinity | 0.002 | | | |

FIG. 9

| SECOND EXAMPLE EMBODIMENT | 1 | 2 | 4 | 5 | 6 | 7 | 8 | 9 | 10 |
|---|---|---|---|---|---|---|---|---|---|
| RADIUS OF CURVATURE | 1.5848 | -8.1683 | 3.2351 | -4.9424 | -1.9413 | -1.1487 | -1.5790 | 2.0204 | 1.3172 |
| CONIC (K) | 0.1117 | -25.0000 | -35.7100 | 32.8865 | -19.7709 | -9.0407 | 0.3262 | -12.3442 | -5.0322 |
| 4TH ORDER (A) | -0.0377 | -0.0005 | 0.0976 | -0.0976 | -0.2240 | -0.1553 | 0.1420 | -0.1860 | -0.0912 |
| 6TH ORDER (B) | 0.2001 | -0.1813 | -0.0333 | -0.1369 | 0.3419 | 0.6748 | -0.0616 | 0.1031 | 0.0471 |
| 8TH ORDER (C) | -1.1047 | 0.4886 | -0.3118 | 0.2273 | -0.8882 | -1.9920 | 0.1027 | -0.0616 | -0.0209 |
| 10TH ORDER (D) | 3.0200 | -1.2106 | 1.7228 | 0.3718 | 1.3442 | 3.3385 | -0.1977 | 0.0319 | 0.0062 |
| 12TH ORDER (E) | -4.7474 | 1.4428 | -3.9709 | -1.3876 | -0.9592 | -3.4558 | 0.2271 | -0.0095 | -0.0012 |
| 14TH ORDER (F) | 3.8783 | -0.6712 | 4.7937 | 2.2038 | 0.3202 | 2.0678 | -0.1249 | 0.0014 | 0.0001 |
| 16TH ORDER (G) | -1.3109 | 0.0000 | -2.5100 | -1.1675 | -0.0406 | -0.5692 | 0.0270 | -0.0001 | 0.0000 |

FIG. 10

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| ST | Infinity | −0.155 | | | STOP |
| 1 | 1.503 | 0.465 | 1.5470 | 56.10 | FIRST LENS |
| 2 | −8.002 | 0.051 | | | |
| 3 | 1E+18 | 0.230 | 1.6500 | 21.50 | SECOND LENS |
| 4 | 3.014 | 0.294 | | | |
| 5 | −4.881 | 0.443 | 1.5470 | 56.10 | THIRD LENS |
| 6 | −1.952 | 0.226 | | | |
| 7 | −1.179 | 0.259 | 1.6500 | 21.50 | FOURTH LENS |
| 8 | −1.578 | 0.403 | | | |
| 9 | 2.048 | 0.886 | 1.5350 | 55.70 | FIFTH LENS |
| 10 | 1.317 | 0.284 | | | |
| 11 | Infinity | 0.110 | 1.5160 | 55.15 | FILTER |
| 12 | Infinity | 0.548 | | | |
| IMAGE PLANE | Infinity | 0.001 | | | |

FIG. 14

| THIRD EXAMPLE EMBODIMENT | 1 | 2 | 4 | 5 | 6 | 7 | 8 | 9 | 10 |
|---|---|---|---|---|---|---|---|---|---|
| RADIUS OF CURVATURE | 1.5028 | -8.0019 | 3.0136 | -4.8810 | -1.9519 | -1.1789 | -1.5781 | 2.0480 | 1.3174 |
| CONIC (K) | 0.1001 | -10.0000 | -43.0251 | 28.8174 | -17.0929 | -9.0297 | 0.3356 | -20.6620 | -7.0169 |
| 4TH ORDER (A) | -0.0221 | 0.0717 | 0.0949 | -0.1239 | -0.2712 | -0.3856 | -0.0444 | -0.2033 | -0.0599 |
| 6TH ORDER (B) | 0.1195 | -0.3163 | -0.2089 | -0.3567 | 0.5102 | 1.9319 | 0.7499 | 0.1486 | 0.0132 |
| 8TH ORDER (C) | -0.5958 | 1.0788 | 0.3121 | 2.1170 | -0.5437 | -4.4401 | -1.2162 | -0.1278 | 0.0012 |
| 10TH ORDER (D) | 1.2062 | -2.9994 | -0.5674 | -8.5436 | -1.7163 | 5.2714 | 0.8117 | 0.0692 | -0.0033 |
| 12TH ORDER (E) | -1.3036 | 3.8227 | 2.3942 | 19.5613 | 5.3383 | -3.4012 | -0.0096 | -0.0193 | 0.0012 |
| 14TH ORDER (F) | 0.3418 | -2.0171 | -4.2639 | -21.3976 | -5.1567 | 1.1863 | -0.2280 | 0.0026 | -0.0002 |
| 16TH ORDER (G) | 0.0000 | 0.0000 | 2.8025 | 9.5051 | 1.7604 | -0.2279 | 0.0761 | -0.0001 | 0.0000 |

FIG. 15

LENS MODULE

CROSS-REFERENCE TO RELATED APPLICATION(S)

This application claims the benefit of Korean Patent Application No. 10-2014-0185960 filed on Dec. 22, 2014 in the Korean Intellectual Property Office, the entire disclosure of which is incorporated herein by reference for all purposes.

BACKGROUND

1. Field

The following description relates to a lens module having an optical system including multiple lenses.

2. Description of Related Art

A lens module mounted in a camera of a mobile communications terminal includes a plurality of lenses. For example, a lens module may include five lenses in order to configure an optical system having high resolution.

However, when the optical system having high resolution is configured using the plurality of lenses as described above, a length (distance from an object-side surface of a first lens to an image plane) of the optical system may be increased. In this case, it is difficult to mount the lens module in a slim mobile communications terminal. Therefore, the development of a lens module having an optical system of decreased length has been demanded.

Examples of lens modules are disclosed in Korean Patent No. 2013-0038631 A and U.S. Patent Application No. 2014/0285907 A1.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a lens module includes: a first lens including a convex object-side surface and a convex image-side surface; a second lens including a concave image-side surface; a third lens including a concave object-side surface; a fourth lens having negative refractive power, and including a concave object-side surface; and a fifth lens having negative refractive power and including an image-side surface having one or more inflection points, and a convex object-side surface. The first lens, the second lens, the third lens, the fourth lens and the fifth lens are sequentially disposed in a direction from an object side of the lens module. The expression f/ImgH<1.3 is satisfied, with f being an overall focal length of an optical system including the first lens, the second lens, the third lens, the fourth lens and the fifth lens, and with ImgH being half of a diagonal length of an image sensor.

The second lens may further include a flat object-side surface.

The third lens further may include a convex image-side surface.

The fourth lens may further include a convex image-side surface.

The image-side surface of the fifth lens may be concave.

The object-side surface of the fifth lens may include one or more inflection points.

The second lens may have a negative refractive power.

The refractive power of the fourth lens may be weaker than the refractive power of the second lens and the refractive power of the fifth lens. The refractive power of the second lens may be stronger than the refractive power of the fourth lens and the refractive power of the fifth lens.

According to another general aspect, a lens module includes: a first lens including a convex object-side surface and a convex image-side surface; a second lens having negative refractive power, and including a concave image-side surface; a third lens having positive refractive power, and including a concave object-side surface; a fourth lens having negative refractive power; and a fifth lens having negative refractive power and including an image-side surface having one or more inflection points. The first lens, the second lens, the third lens, the fourth lens and the fifth lens are sequentially disposed in a direction from an object side of the lens module. The expression f/ImgH<1.3 is satisfied, with f being an overall focal length of an optical system including the first lens, the second lens, the third lens, the fourth lens and the fifth lens, and with ImgH being half of a diagonal length of an image sensor.

The expression $1.0<f12/f<1.5$ may be satisfied, with f12 being a composite focal length of the first and second lenses.

The expression $18.0<TTL/D3$ may be satisfied, with TTL being a distance from the object-side surface of the first lens to an image plane, and with D3 being a thickness of the second lens.

The expression $18.0<TTL/D8$ may be satisfied, with TTL being a distance from an object-side surface of the first lens to an image plane, and with D8 being a distance from an image-side surface of the fourth lens to an object-side surface of the fifth lens.

The expression $BFL/f<0.28$ may be satisfied, with BFL being a distance from the image-side surface of the fifth lens to an image plane.

The expression $0.4<r1/f$ may be satisfied, with r1 being a radius of curvature of the object-side surface of the first lens.

The expression $30<|V1-V2|<40$ may be satisfied, with V1 being an Abbe number of the first lens, and with V2 being an Abbe number of the second lens.

The expression $-2.0<(r7-r8)/(r7+r8)<0.0$ may be satisfied, with r7 being a radius of curvature of an object-side surface of the fourth lens, and with r8 being a radius of curvature of an image-side surface of the fourth lens.

The second lens may further include a flat object-side surface.

The lens module may further include a filter formed of plastic and disposed between the fifth lens and an image plane.

The expression $Vf<60$ may be satisfied, with Vf being an Abbe number of the filter.

Other features and aspects will be apparent from the following detailed description, the drawings, and the claims.

BRIEF DESCRIPTION OF THE DRAWINGS

FIG. 4 is a table representing characteristics of lenses illustrated in FIG. 1.

FIG. 5 is a table representing conic constants and aspheric coefficients of the lens module illustrated in FIG. 1.

FIG. 9 is a table representing characteristics of lenses illustrated in FIG. 6.

FIG. 10 is a table representing conic constants and aspheric coefficients of the lens module illustrated in FIG. 6.

FIG. 14 is a table representing characteristics of lenses illustrated in FIG. 11.

FIG. 15 is a table illustrating conic constants and aspheric coefficients of the lens module illustrated in FIG. 11.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
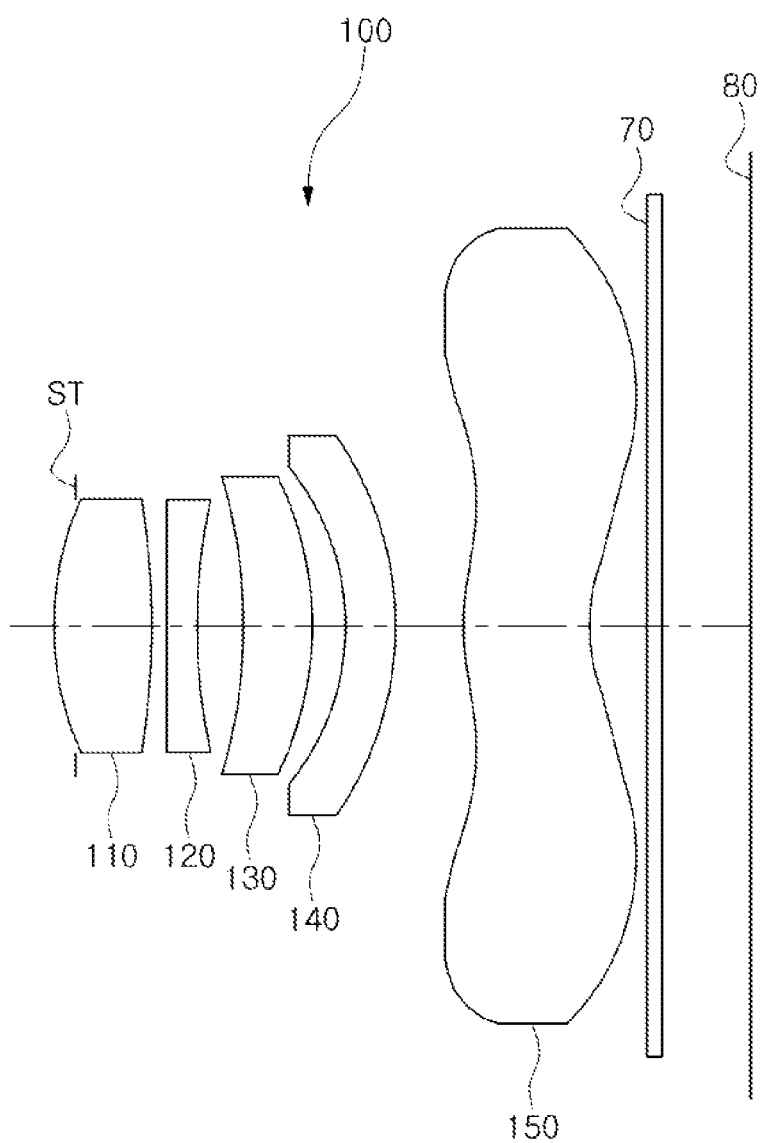
FIG. 1 is a view of a lens module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In addition, in the following description, a first lens refers to a lens closest to an object (or a subject), while a fifth lens refers to a lens closest to an image plane (or an image sensor). Further, a first (object-side) surface of each lens refers to a surface thereof closest to an object (or a subject), and a second (image-side) surface of each lens refers to a surface thereof closest to an image plane (or an image sensor). Further, all of radii of curvature, thicknesses, OALs (optical axis distances from a first surface of the first lens to the image plane), SLs, ImgHs (half of a diagonal length of the image sensor), and BFLs (back focus lengths) of the lenses, an overall focal length of an optical system, and a focal length of each lens are expressed in millimeters (mm). Additionally, thicknesses of lenses, gaps between the lenses, OALs, and SLs are distances measured based on an optical axis of the lenses. Further, in a description for shapes of the lenses, the description of a surface of a lens as being convex means that an optical axis portion (e.g., central portion) of the corresponding surface is convex, and the description of a surface of a lens as being concave means that an optical axis portion (e.g., central portion) of the corresponding surface is concave. Therefore, although it is described that a surface of a lens is convex, an edge portion of the lens may be concave. Likewise, although it is described that a surface of a lens is concave, an edge portion of the lens may be convex.

According to the disclosure herein, a lens module includes an optical system including a plurality of lenses. For example, the optical system of the lens module may include five lenses having refractive power. However, the lens module is not limited to only including the five lenses. For example, the lens module may include other components that do not have refractive power. As an example, the lens module may include a stop configured to control an amount of light. As another example, the lens module may further include an infrared cut-off filter configured to filter infrared light. As another example, the lens module may further include an image sensor (that is, an imaging device) configured to convert an image of a subject incident thereon through the optical system into electrical signals. As another example, the lens module may further include a gap maintaining member configured to adjust a gap between lenses.

First to fifth lenses are formed of materials having a refractive index different from that of air. For example, the first to fifth lenses may be formed of plastic or glass. At least one of the first to fifth lenses may have an aspheric shape. For example, only the fifth lens of the first to fifth lenses may have the aspheric shape. As another example, at least one surface of all of the first to fifth lenses may be aspherical. Here, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{[Equation 1]}$$

In Equation 1, c is an inverse of a radius of curvature of a corresponding lens, K is a conic constant, and r is a distance from a certain point on an aspherical surface to an optical axis in a direction perpendicular to the optical axis. In addition, constants A to J sequentially refer to 4-th order to 20-th order aspheric coefficients. In addition, Z is a distance between the certain point on the aspherical surface at the distance r and a tangential plane meeting the apex of the aspherical surface of the lens.

The optical system configuring the lens module may have a wide field of view (FOV) of 78 degrees or more. Therefore, the lens module according to the examples disclosed herein may easily photograph a wide background or object.

The lens module includes the first to fifth lenses. In addition, the lens module includes a filter and an image sensor. Next, the above-mentioned components will be described.

The first lens has refractive power. For example, the first lens may have positive refractive power.

Both surfaces of the first lens may be convex. For example, a first surface (object-side surface) of the first lens may be convex and a second surface (image-side surface) thereof may be convex.

The first lens may have an aspherical surface. For example, first and second surfaces of the first lens may be aspherical. The first lens may be formed of a material having high light transmissivity and excellent workability. For example, the first lens may be formed of plastic or glass. However, a material of the first lens is not limited to plastic or glass.

The second lens has refractive power. For example, the second lens may have negative refractive power.

One surface of the second lens may be concave. For example, a second surface of the second lens may be concave. One surface of the second lens may be flat. For example, a first surface of the second lens may be flat. In a case in which the first surface of the second lens is flat, the second lens may be easily manufactured.

The second lens may have an aspherical surface. For example, the second surface of the second lens may be aspherical. The second lens may be formed of a material having high light transmissivity and excellent workability. For example, the second lens may be formed of plastic or glass. However, a material of the second lens is not limited to plastic or glass.

The second lens may be formed of a material having a high refractive index. For example, the second lens may be formed of a material having a refractive index of about 1.60 or more (in this case, the second lens may have an Abbe number of about 30 or less). The second lens formed of this material may easily refract light even while having a small curvature. Therefore, the second lens formed of this material may be easily manufactured and may be advantageous in lowering a defect rate depending on manufacturing tolerance. In addition, the second lens formed of this material may decrease a distance between lenses, and thus it may be advantageous in miniaturizing the lens module.

The third lens has refractive power. For example, the third lens may have positive refractive power.

The third lens may have a meniscus shape. For example, the third lens may have a meniscus shape of which a first surface is concave and a second surface is convex.

The third lens may have an aspherical surface. For example, first and second surfaces of the third lens may be aspherical. The third lens may be formed of a material having high light transmissivity and excellent workability. For example, the third lens may be formed of plastic or glass. However, a material of the third lens is not limited to plastic or glass.

The fourth lens has refractive power. For example, the fourth lens may have negative refractive power.

The fourth lens may have a meniscus shape. For example, the fourth lens may have a meniscus shape of which a first surface is concave and a second surface is convex.

The fourth lens may have an aspherical surface. For example, the first and second surfaces of the fourth lens may be aspherical. The fourth lens may be formed of a material having high light transmissivity and excellent workability. For example, the fourth lens may be formed of plastic or glass. However, a material of the fourth lens is not limited to plastic or glass.

The fourth lens may be formed of a material having a high refractive index. For example, the fourth lens may be formed of a material having a refractive index of about 1.60 or more (in this case, the fourth lens may have an Abbe number of about 30 or less). The fourth lens formed of this material may easily refract light even while having a small curvature. Therefore, the fourth lens formed of this material may be easily manufactured and be advantageous in lowering a defect rate depending on manufacturing tolerance. In addition, the fourth lens formed of this material may decrease a distance between lenses, and thus it may be advantageous in miniaturizing the lens module.

The fifth lens has refractive power. For example, the fifth lens may have negative refractive power.

The fifth lens may have a meniscus shape. For example, the fifth lens may have a meniscus shape of which a first surface is convex and a second surface is concave.

The fifth lens may include an inflection point. For example, the fifth lens may have one or more inflection points formed on the first surface thereof. As another example, the fifth lens may have one or more inflection points formed on the second surface thereof. The first surface of the fifth lens configured as described above may have a convex part and a concave part formed alternately thereon. Similarly, the second surface of the fifth lens may be concave at the center of the optical axis thereof, but may be convex at an edge portion thereof.

The fifth lens may have an aspherical surface. For example, the first and second surfaces of the fifth lens may be aspherical. The fifth lens may be formed of a material having high light transmissivity and excellent workability. For example, the fifth lens may be formed of plastic or glass. However, a material of the fifth lens is not limited to plastic or glass.

The filter is configured to filter a partial wavelength from incident light incident through the first to fifth lenses. For example, the filter may be an infrared cut-off filter configured to filter an infrared wavelength of the incident light. The filter may be formed of plastic and have an Abbe number of about 60 or less.

The image sensor may realize high resolution of about 1300 megapixels. For example, a unit size of the pixels configuring the image sensor may be about 1.12 μm or less.

The lens module configured as describe above may have a wide field of view. For example, the optical system of the lens module may have a field of view of 78 degrees or more. In addition, the lens module may have a relatively short length (TTL). For example, an overall length (distance from the object-side surface of the first lens to the image plane) of the optical system configuring the lens module may be 4.50 mm or less. Therefore, the lens module according to the examples disclosed herein may be advantageously miniaturized.

The lens module may satisfy the following Conditional Expression 1:

$$f/\text{ImgH} < 1.3. \qquad \text{[Conditional Expression 1]}$$

In Conditional Expression 1, f is an overall focal length of the optical system including the first to fifth lenses, and ImgH is a maximum image height of the optical system. For example, ImgH is half of a diagonal length of the image sensor.

Conditional Expression 1 may be one optimization condition for manufacturing the lens module and improving an aberration correction effect. For example, in a case in which f/ImgH is outside of an upper limit value of Conditional Expression 1, it may be difficult to manufacture the optical system and correct aberration of the optical system.

In addition, the lens module may satisfy the following Conditional Expression 2:

$$1.0 < f12/f < 1.5. \qquad \text{[Conditional Expression 2]}$$

In Conditional Expression 2, f12 is a composite focal length of the first and second lenses, and f is the overall focal length of the optical system including the first to fifth lenses.

Conditional Expression 2 may be a condition for optimizing an aberration correction effect through the first and second lenses. For example, in a case in which f12/f is outside of a lower limit value of Conditional Expression 2, refractive power of the first and second lenses of the optical system may be excessively high, and thus it may be difficult to correct a spherical aberration of the optical system. As another example, in a case in which f12/f is outside of an upper limit value of Conditional Expression 2, it may be easy to correct aberration of the optical system through the first and second lenses, but a length of the optical system may become long.

In addition, the lens module may satisfy the following Conditional Expression 3:

$$18.0 < TTL/D3. \qquad \text{[Conditional Expression 3]}$$

In Conditional Expression 3, TTL is a distance from the object-side surface of the first lens to the image plane, and D3 is a thickness of the second lens.

Conditional Expression 3 may be one optimization condition for miniaturizing the optical system. For example, in a case in which TTL/D3 is outside of a lower limit value of Conditional Expression 3, it may be difficult to miniaturize the optical system.

In addition, the lens module may satisfy the following Conditional Expression 4:

$$18.0 < TTL/D8. \qquad \text{[Conditional Expression 4]}$$

In Conditional Expression 4, TTL is the distance from the object-side surface of the first lens to the image plane, and D8 is a distance from an image-side surface of the fourth lens to the object-side surface of the fifth lens.

Conditional Expression 4 may be one condition for optimizing manufacturing of the lens module. For example, in a case in which TTL/D8 is outside of a lower limit value of Conditional Expression 4, it may be difficult to manufacture the lens module and make the lens module light.

In addition, the lens module may satisfy the following Conditional Expression 5:

$$BFL/f < 0.28. \qquad \text{[Conditional Expression 5]}$$

In Conditional Expression 5, BFL is a distance from the image-side surface of the fifth lens to the image plane, and f is the overall focal length of the optical system including the first to fifth lenses. Conditional Expression 5 may be one optimization condition for miniaturizing the optical system. For example, in a case in which BFL/f is outside of an upper limit value of Conditional Expression 5, it may be difficult to miniaturize the optical system.

In addition, the lens module may satisfy the following Conditional Expression 6:

$$0.4 < r1/f. \qquad \text{[Conditional Expression 6]}$$

In Conditional Expression 6, r1 is a radius of curvature of the object-side surface of the first lens, and f is the overall focal length of the optical system including the first to fifth lenses.

Conditional Expression 6 may be one condition for optimizing manufacturing of the first lens. For example, in a case in which r1/f is outside of a lower limit value of Conditional Expression 6, a radius of curvature of the first lens may be excessively small, and thus it may be difficult to manufacture the first lens, and the first lens may be sensitive to manufacturing tolerance.

In addition, the lens module may satisfy the following Conditional Expression 7:

$$30 < |V1 - V2| < 40. \qquad \text{[Conditional Expression 7]}$$

In Conditional Expression 7, V1 is an Abbe number of the first lens, and V2 is an Abbe number of the second lens.

Conditional Expression 7 may be one condition for optimizing an aberration correction effect through the first and second lenses. For example, in a case in which |V1−V2| is outside of a range of Conditional Expression 7, it may be difficult to correct aberration through a combination of the first and second lenses.

In addition, the lens module may satisfy the following Conditional Expression 8:

$$-2.0 < (r7 - r8)/(r7 + r8) < 0.0. \qquad \text{[Conditional Expression 8]}$$

In Conditional Expression 8, r7 is a radius of curvature of an object-side surface of the fourth lens, and r8 is a radius of curvature of the image-side surface of the fourth lens.

Conditional Expression 8 may be one condition for optimizing an aberration correction effect by the fourth lens. For example, in a case in which (r7-r8)/(r7+r8) is outside of a numerical range of Conditional Expression 8, it may be difficult to correct aberration through the fourth lens.

A lens module 100 according to an example will be described with reference to FIG. 1.

The lens module 100 includes an optical system including a first lens 110, a second lens 120, a third lens 130, a fourth lens 140, and a fifth lens 150. In addition, the lens module 100 includes an infrared cut-off filter 70 and an image sensor 80. Further, the lens module 100 includes a stop ST. For example, the stop ST may be disposed in front of an object-side surface of the first lens 110.

The first lens 110 has positive refractive power, and an object-side surface thereof is convex and an image-side surface thereof is convex. The second lens 120 has negative refractive power, and an object-side surface thereof is flat and an image-side surface thereof is concave. The third lens 130 has positive refractive power, and an object-side surface thereof is concave and an image-side surface thereof is convex. The fourth lens 140 has negative refractive power, and an object-side surface thereof is concave and an image-side surface thereof is convex. The fifth lens 150 has negative refractive power, and an object-side surface thereof is convex and an image-side surface thereof is concave. In addition, one or more inflection points are formed on each of the object-side surface and the image-side surface of the fifth lens 150.

Each of the second lens 120, the fourth lens 140, and the fifth lens 150 has negative refractive power, as described above. Among these lenses, the fourth lens 140 may have the weakest refractive power, and the second lens 120 may have the strongest refractive power.

Figure 2:
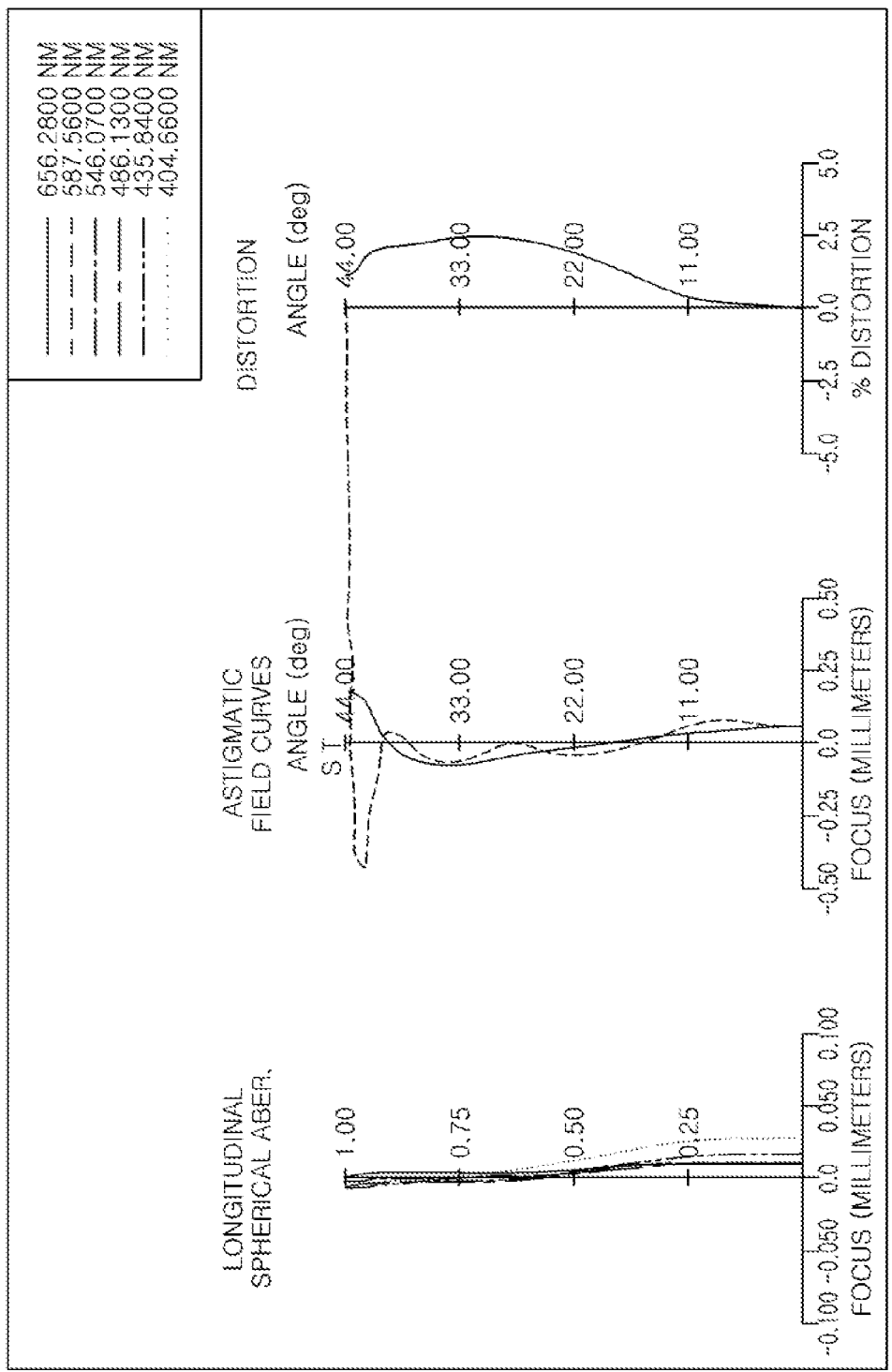
FIG. 2 includes graphs having curves representing modulation transfer function (MTF) characteristics of the lens module illustrated in FIG. 1.
Figure 3:
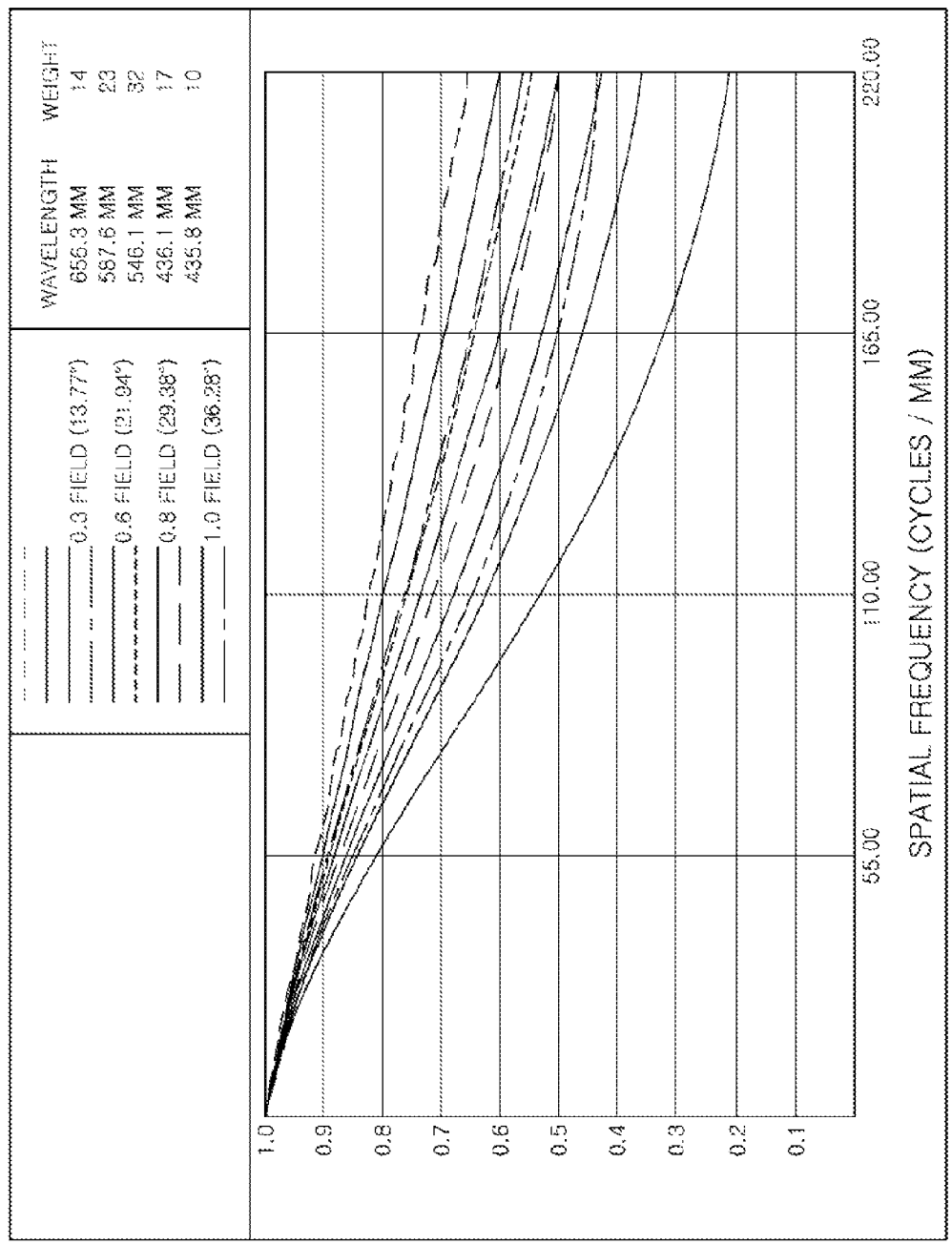
FIG. 3 includes graphs having curves representing aberration characteristics of the lens module illustrated in FIG. 1.

FIGS. 2 and 3 are graphs having curves representing modulation transfer function (MTF) characteristics and aberration characteristics of the lens module 100.

FIG. 4 is a table representing characteristics of the lenses 110, 120, 130, 140 and 150 configuring the lens module 100. In FIG. 4, Surface Nos. 1 and 2 indicate the first surface (object-side surface) and the second surface (image-side surface), respectively, of the first lens 110, and Surface Nos. 3 and 4 indicate the first and second surfaces, respectively, of the second lens 120. Similarly, Surface Nos. 5 to 10 indicate the first and second surfaces of the third to fifth lenses 130-150, respectively. In addition, Surface Nos. 11 and 12 indicate first and second surfaces, respectively, of the infrared cut-off filter 70.

FIG. 5 is a table representing conic constants and aspheric coefficients of the lenses 110, 120, 130, 140 and 150. In FIG. 5, numbers 1 to 10 indicate Surface Nos. of respective surfaces of the first to fifth lenses 110-150, K indicates conic constants of respective surfaces of the first to fifth lenses 110-150, and A-G indicate aspheric coefficients of respective surfaces of the first to fifth lenses 110-150.

Figure 6:
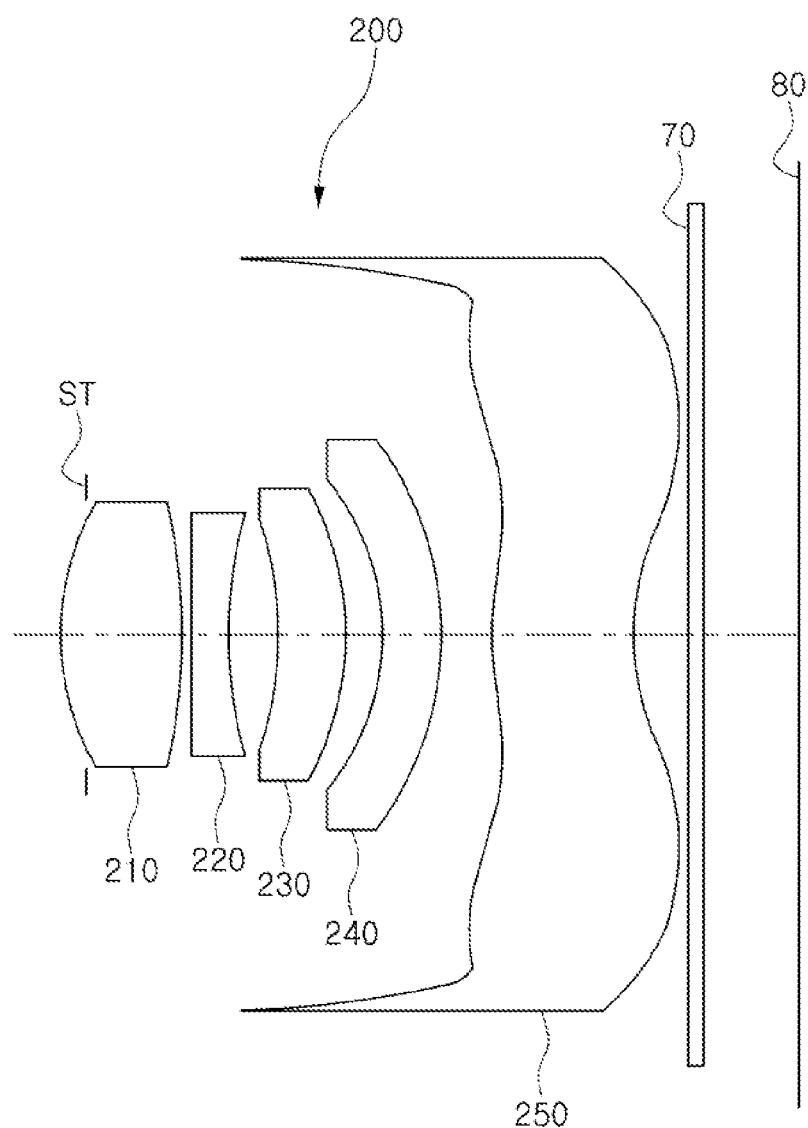
FIG. 6 is a view of a lens module according to another example.

A lens module 200 according to another example will be described with reference to FIG. 6.

The lens module 200 includes an optical system including a first lens 210, a second lens 220, a third lens 230, a fourth lens 240, and a fifth lens 250. In addition, the lens module 200 includes an infrared cut-off filter 70 and an image sensor 80. Further, the lens module 200 includes a stop ST. For example, the stop ST may be disposed in front of an object-side surface of the first lens 210.

The first lens 210 has positive refractive power, and an object-side surface thereof is convex and an image-side surface thereof is convex. The second lens 220 has negative refractive power, and an object-side surface thereof is flat and an image-side surface thereof is concave. The third lens 230 has positive refractive power, and an object-side surface thereof is concave and an image-side surface thereof is convex. The fourth lens 240 has negative refractive power, and an object-side surface thereof is concave and an image-side surface thereof is convex. The fifth lens 250 has negative refractive power, and an object-side surface thereof is convex and an image-side surface thereof is concave. In addition, one or more inflection points are formed on each of the object-side surface and the image-side surface of the fifth lens 250.

Each of the second lens 220, the fourth lens 240, and the fifth lens 250 has negative refractive power, as described above. Among these lenses, the fifth lens 240 may have the weakest refractive power, and the second lens 220 may have the strongest refractive power.

Figure 7:
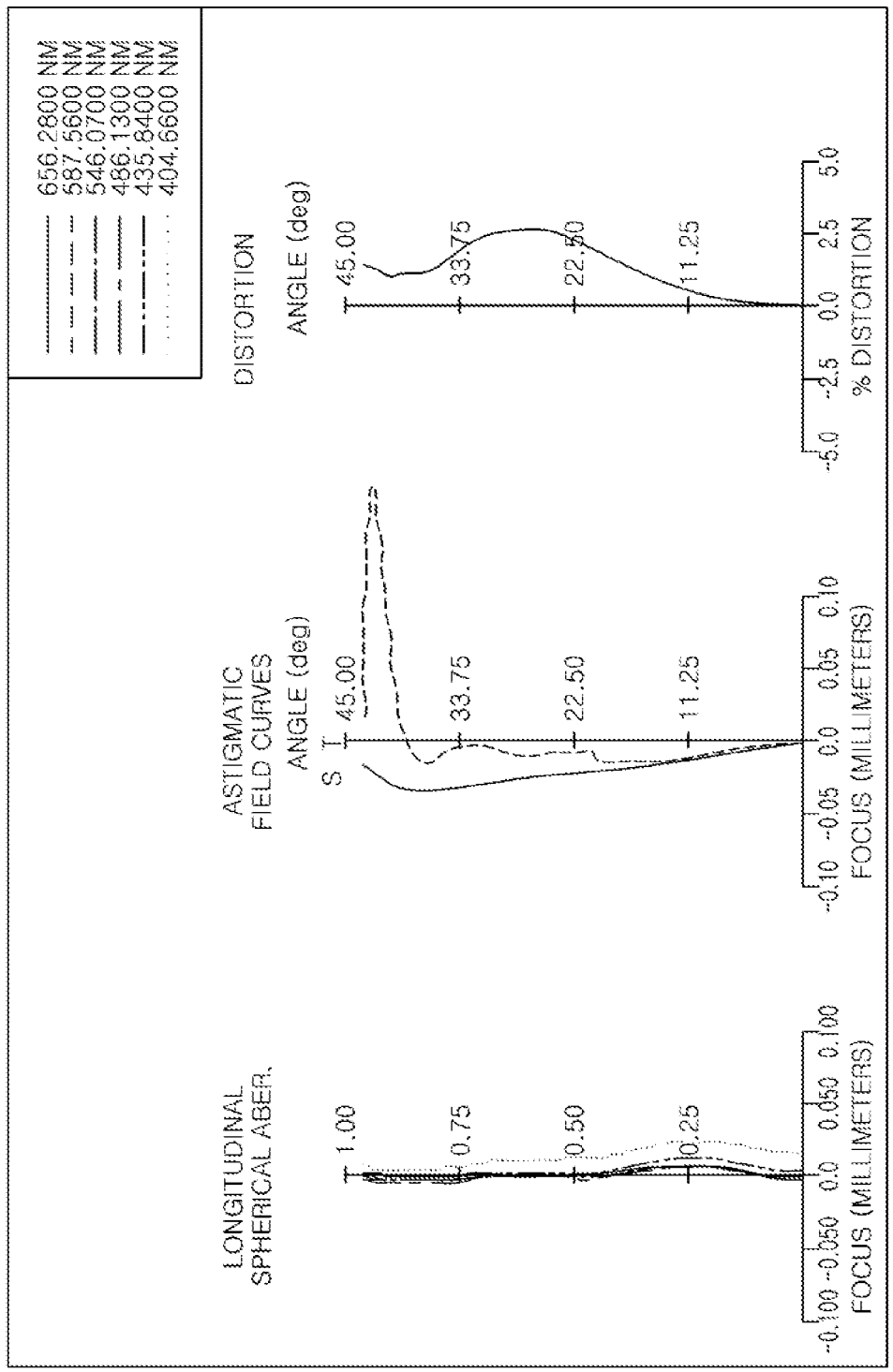
FIG. 7 includes graphs having curves representing MTF characteristics of the lens module illustrated in FIG. 6.
Figure 8:
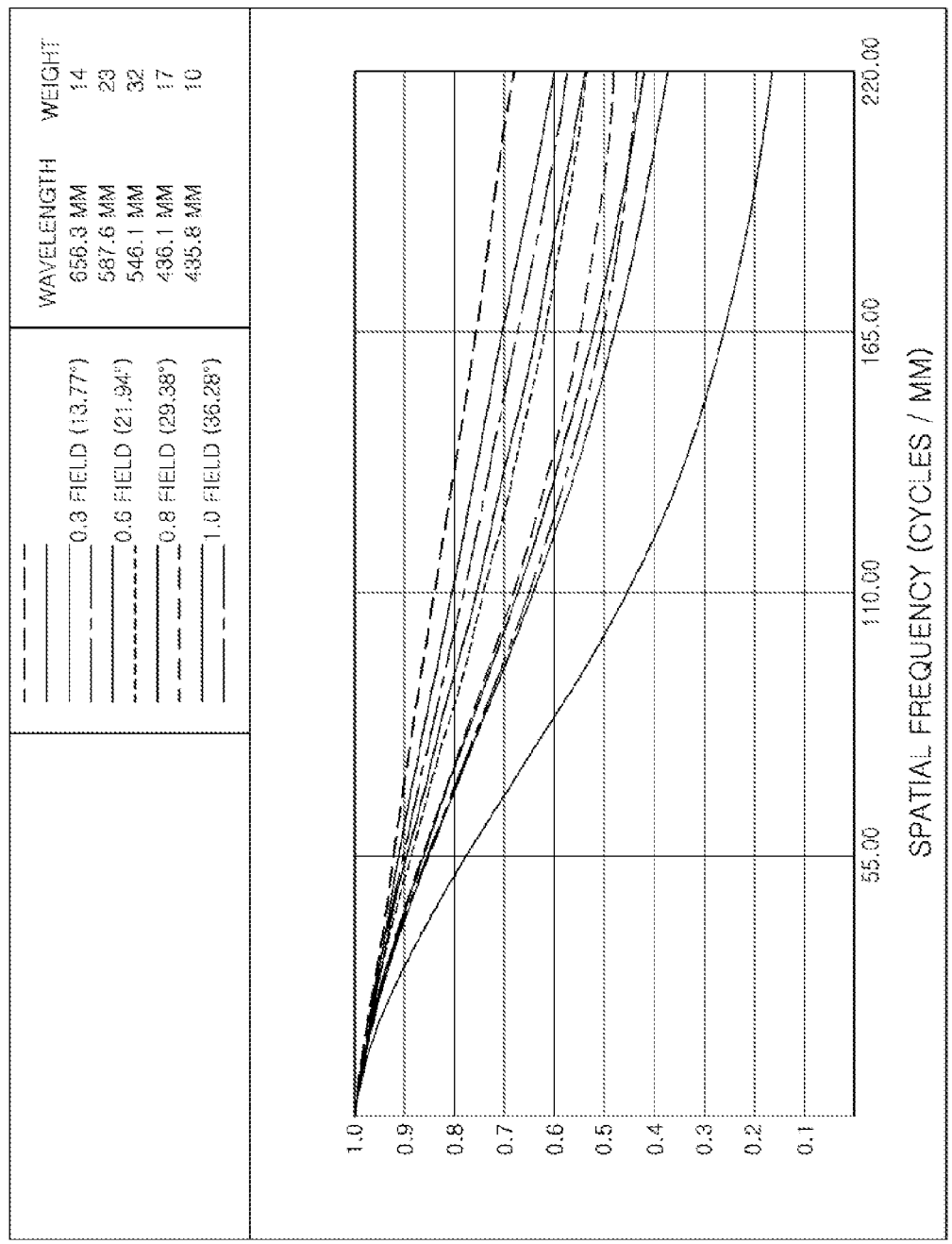
FIG. 8 includes graphs having curves representing aberration characteristics of the lens module illustrated in FIG. 6.

FIGS. 7 and 8 are graphs having curves representing MTF characteristics and aberration characteristics of the lens module 200.

FIG. 9 is a table representing characteristics of the lenses 210, 220, 230, 240 and 250 configuring the lens module 200. In FIG. 9, Surface Nos. 1 and 2 indicate the first surface (object-side surface) and the second surface (image-side surface), respectively, of the first lens 210, and Surface Nos. 3 and 4 indicate the first and second surfaces, respectively, of the second lens 220. Similarly, Surface Nos. 5 to 10 indicate the first and second surfaces of the third to fifth lenses 230-250, respectively. In addition, Surface Nos. 11 and 12 indicate first and second surfaces, respectively, of the infrared cut-off filter 70.

FIG. 10 is a table representing conic constants and aspheric coefficients of the lenses 210, 220, 230, 240 and 250. In FIG. 10, numbers 1 to 10 indicate Surface Nos. of respective surfaces of the first to fifth lenses 210-250, K indicates conic constants of respective surfaces of the first to fifth lenses 210-250, and A-G indicate aspheric coefficients of respective surfaces of the first to fifth lenses 210-250.

Figure 11:
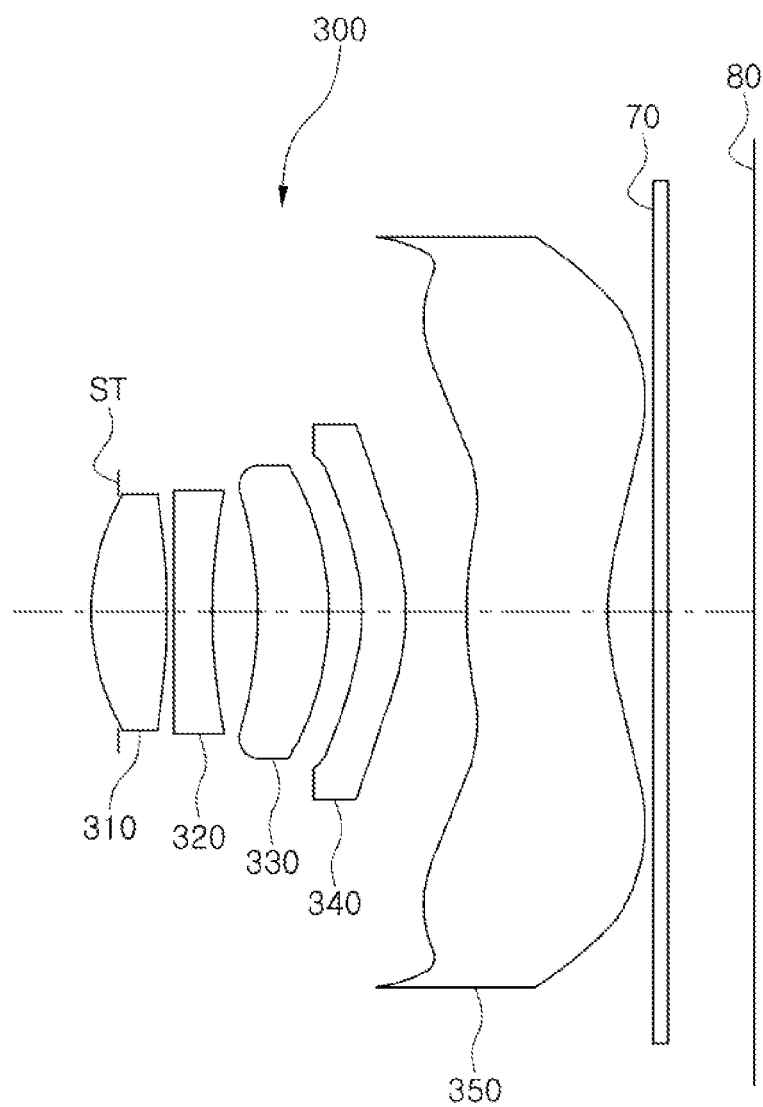
FIG. 11 is a view of a lens module according to another example.

A lens module 300 according to another example will be described with reference to FIG. 11.

The lens module 300 includes an optical system including a first lens 310, a second lens 320, a third lens 330, a fourth lens 340, and a fifth lens 350. In addition, the lens module 300 includes an infrared cut-off filter 70 and an image sensor 80. Further, the lens module 300 includes a stop ST. For example, the stop ST may be disposed in front of an object-side surface of the first lens 310.

The first lens 310 has positive refractive power, and an object-side surface thereof is convex and an image-side surface thereof is convex. The second lens 320 has negative refractive power, and an object-side surface thereof is flat and an image-side surface thereof is concave. The third lens 330 has positive refractive power, and an object-side surface thereof is concave and an image-side surface thereof is convex. The fourth lens 340 has negative refractive power, and an object-side surface thereof is concave and an image-side surface thereof is convex. The fifth lens 350 has negative refractive power, and an object-side surface thereof is convex and an image-side surface thereof is concave. In addition, one or more inflection points are formed on each of the object-side surface and the image-side surface of the fifth lens 350.

Each of the second lens 320, the fourth lens 340, and the fifth lens 350 has negative refractive power, as described above. Among these lenses, the fifth lens 350 may have the weakest refractive power, and the second lens 320 may have the strongest refractive power.

Figure 12:
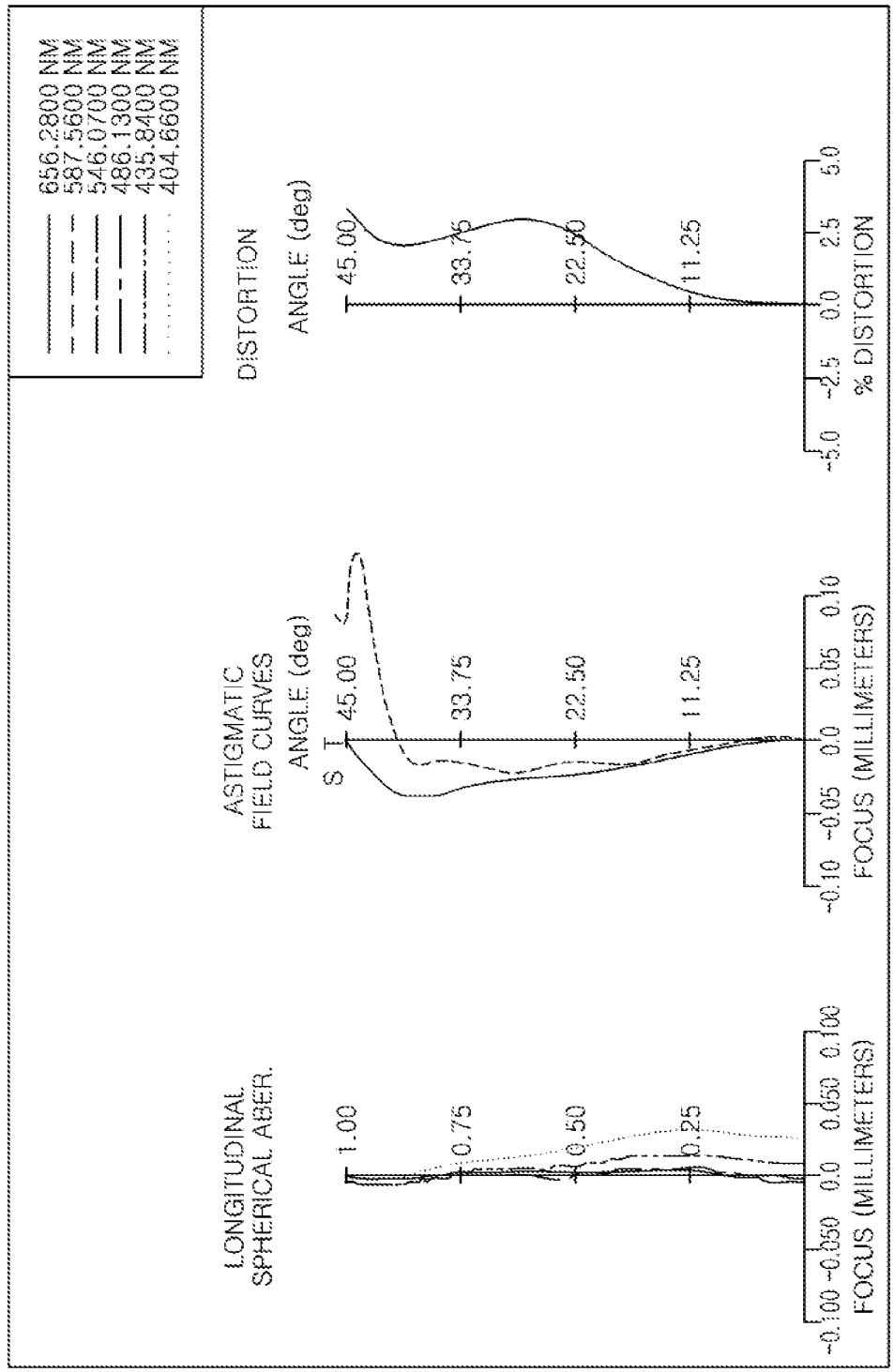
FIG. 12 includes graphs having curves representing MTF characteristics of the lens module illustrated in FIG. 11.
Figure 13:
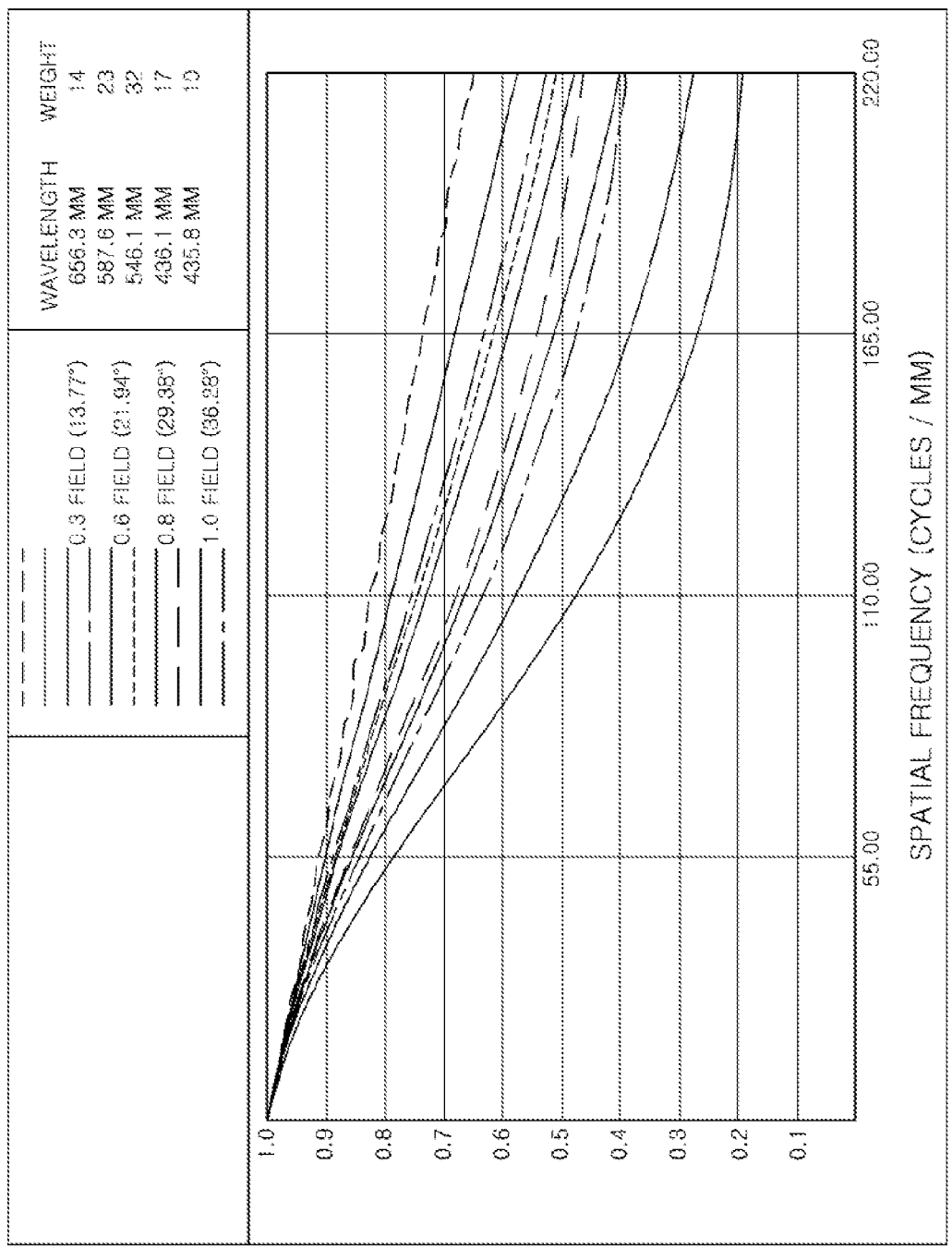
FIG. 13 includes graphs having curves representing aberration characteristics of the lens module illustrated in FIG. 11.

FIGS. 12 and 13 are graphs having curves representing MTF characteristics and aberration characteristics of the lens module 300.

FIG. 14 is a table representing characteristics of the lenses 310, 320, 330, 340 and 350 configuring the lens module 300. In FIG. 14, Surface Nos. 1 and 2 indicate the first surface (object-side surface) and the second surface (image-side surface), respectively, of the first lens 310, and Surface Nos. 3 and 4 indicate the first and second surfaces, respectively, of the second lens 320. Similarly, Surface Nos. 5 to 10 indicate the first and second surfaces of the third to fifth lenses 330-350, respectively. In addition, Surface Nos. 11 and 12 indicate first and second surfaces of the infrared cut-off filter 70.

FIG. 15 is a table representing conic constants and aspheric coefficients of the lenses 310, 320, 330, 340 and 350. In FIG. 15, numbers 1 to 10 indicate Surface Nos. of respective surfaces of the first to fifth lenses 310-350, K indicates conic constants of respective surfaces of the first to fifth lenses 310-350, and A-G indicate aspheric coefficients of respective surfaces of the first to fifth lenses 310-350.

Table 1 represents optical characteristics of the lens modules 100, 200 and 300 according to the examples disclosed herein. The lens module may have an overall focal length (f) of about 3.40 to about 3.70. A focal length (f1) of the first lens may be determined to be in a range of about 2.30 to about 2.60. A focal length (f2) of the second lens may be in a range of about −5.0 to about −4.50. A focal length (f3) of the third lens may be in a range of about 5.0 to about 6.0. A focal length (f4) of the fourth lens may be in a range of about −15.0 to about −9.0. A focal length (f5) of the fifth lens may be determined to be in a range of about −13.0 to about −9.0. An overall length of the optical system may be determined to be in a range of about 4.10 to about 4.50. A field of view (FOV) of the lens module may be in a range of about 77.0 to 83.0.

TABLE 1

| Remark | Lens Module 100 | Lens Module 200 | Lens Module 300 |
|---|---|---|---|
| f | 3.617 | 3.559 | 3.410 |
| f1 | 2.576 | 2.494 | 2.356 |
| f2 | −4.861 | −4.921 | −4.584 |
| f3 | 5.800 | 5.580 | 5.649 |
| f4 | −13.950 | −9.523 | −9.542 |
| f5 | −9.744 | −12.322 | −11.927 |
| TTL | 4.431 | 4.431 | 4.200 |
| BFL | 1.005 | 0.976 | 0.943 |
| FOV | 79.158 | 78.155 | 81.534 |
| f12 | 4.385 | 4.052 | 4.036 |
| ImgH | 2.990 | 2.890 | 2.940 |

Table 2 represents numerical ranges of Conditional Expressions and values of Conditional Expressions of the lens modules 100 to 300.

TABLE 2

| Remark | Lens Module 100 | Lens Module 200 | Lens Module 300 |
|---|---|---|---|
| f12/f | 1.212 | 1.139 | 1.184 |
| TTL/D3 | 21.100 | 19.265 | 18.261 |
| TTL/D8 | 9.891 | 14.819 | 10.422 |
| BFL/f | 0.278 | 0.274 | 0.277 |
| r1/f | 0.455 | 0.445 | 0.441 |
| f/ImgH | 1.210 | 1.231 | 1.160 |
| V1 − V2 | 34.600 | 34.600 | 34.600 |
| (r7 − r8)/(r7 + r8) | −0.119 | −0.158 | −0.145 |

As seen in Table 2, the lens modules 100 to 300 may satisfy all of the Conditional Expressions 1-8.

As set forth above, according to the examples disclosed herein, the optical system may have high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
    a first lens comprising a convex object-side surface and a convex image-side surface;
    a second lens comprising a concave image-side surface;
    a third lens having positive refractive power, and comprising a concave object-side surface;
    a fourth lens having negative refractive power, and comprising a concave object-side surface; and
    a fifth lens having negative refractive power, and comprising:
        an image-side surface having one or more inflection points; and
        a convex object-side surface;
    wherein the first lens, the second lens, the third lens, the fourth lens and the fifth lens are sequentially disposed in a direction starting from an object side of the lens module; and
    the expression f/ImgH<1.3 is satisfied, with f being an overall focal length of an optical system comprising the first lens, the second lens, the third lens, the fourth lens, and the fifth lens, and ImgH being half of a diagonal length of an image sensor.

2. The lens module of claim 1, wherein the second lens further comprises a flat object-side surface.

3. The lens module of claim 1, wherein the third lens further comprises a convex image-side surface.

4. The lens module of claim 1, wherein the fourth lens further comprises a convex image-side surface.

5. The lens module of claim 1, wherein the image-side surface of the fifth lens is concave.

6. The lens module of claim 1, wherein the object-side surface of the fifth lens comprises one or more inflection points.

7. The lens module of claim 1, wherein the second lens has a negative refractive power;
    the refractive power of the fourth lens is weaker than the refractive power of the second lens and the refractive power of the fifth lens, or the refractive Dower of the fifth lens is weaker than the refractive power of the third lens and the refractive power of the fourth lens; and
    the refractive power of the second lens is stronger than the refractive power of the fourth lens and the refractive power of the fifth lens.

8. A lens module comprising:
    a first lens comprising a convex object-side surface and a convex image-side surface;
    a second lens having negative refractive power, and comprising a concave image-side surface;
    a third lens having positive refractive power, and comprising a concave object-side surface;
    a fourth lens having negative refractive power; and
    a fifth lens having negative refractive power and comprising an image-side surface having one or more inflection points;
    wherein the first lens, the second lens, the third lens, the fourth lens and the fifth lens are sequentially disposed in a direction starting from an object side of the lens module; and
    the expression f/ImgH<1.3 is satisfied, with f being an overall focal length of an optical system comprising the first lens, the second lens, the third lens, the fourth lens, and the fifth lens, and ImgH being half of a diagonal length of an image sensor.

9. The lens module of claim 8, wherein the expression 1.0<f12/f<1.5 is satisfied, with f12 being a composite focal length of the first lens and the second lens.

10. The lens module of claim 8, wherein the expression 18.0<TTL/D3 is satisfied, with TTL being a distance from the object-side surface of the first lens to an image plane, and D3 being a thickness of the second lens.

11. The lens module of claim 8, wherein the expression 18.0<TTL/D8 is satisfied, with TTL being a distance from an object-side surface of the first lens to an image plane, and D8 being a distance from an image-side surface of the fourth lens to an object-side surface of the fifth lens.

12. The lens module of claim 8, wherein the expression BFL/f<0.28 is satisfied, with BFL being a distance from the image-side surface of the fifth lens to an image plane.

13. The lens module of claim 8, wherein the expression 0.4<r1/f is satisfied, with r1 being a radius of curvature of the object-side surface of the first lens.

14. The lens module of claim 8, wherein the expression 30<|V1−V2|<40 is satisfied, with V1 being an Abbe number of the first lens, and V2 being an Abbe number of the second lens.

15. The lens module of claim 8, wherein the expression −2.0<(r7−r8)/(r7+r8)<0.0 is satisfied, with r7 being a radius of curvature of an object-side surface of the fourth lens, and being a radius of curvature of an image-side surface of the fourth lens.

16. The lens module of claim 8, wherein the second lens further comprises a flat object-side surface.

17. The lens module of claim 8, further comprising a filter formed of plastic and disposed between the fifth lens and an image plane.

18. The lens module of claim 17, wherein the expression Vf<60 is satisfied, with Vf being an Abbe number of the filter.

19. The lens module of claim 1, wherein the expression BFL/f<0.28 is satisfied, with BFL being a distance from the image-side surface of the fifth lens to an image plane.

20. The lens module of claim 1, wherein the expression |f1|<|f2|<|f3|<|f4|<|f5| or the expression |f1|<|f2|<|f3|<|f5|<|f4| is satisfied, with f1 being a focal length of the first lens, f2 being a focal length of the second lens, f3 being a focal length of the third lens, f4 being a focal length of the fifth lens, and f5 being a focal length of the fifth lens.

21. The lens module of claim 8, wherein the expression |f1|<|f2|<|f3|<|f4|<|f5| or the expression |f1|<|f2|<|f3|<|f5|<|f4| is satisfied, with f1 being a focal length of the first lens, f2 being a focal length of the second lens, f3 being a focal length of the third lens, f4 being a focal length of the fifth lens, and f5 being a focal length of the fifth lens.

\* \* \* \* \*